3,324,186
HYDROCARBON OXIDATION PROCESS
Harry Olenberg, Bronx, N.Y., assignor to Halcon International, Inc., a corporation of Delaware
Filed Dec. 13, 1962, Ser. No. 244,388
7 Claims. (Cl. 260—631)

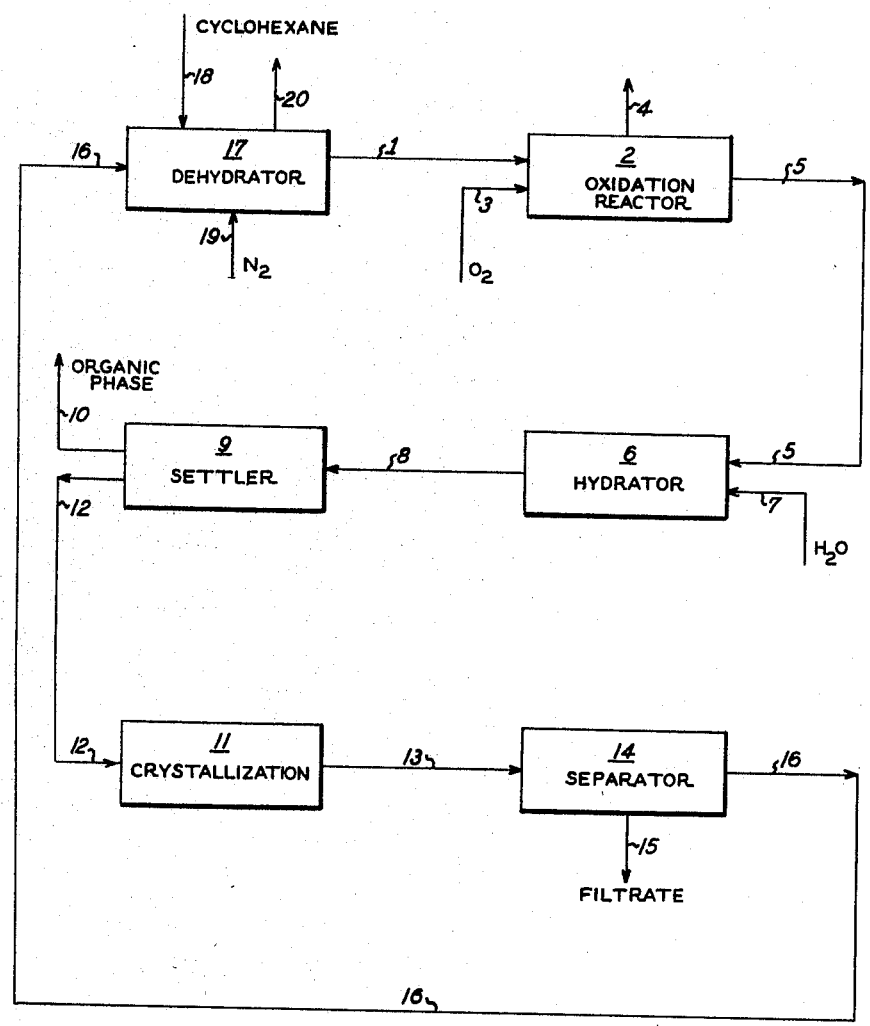

This invention relates to an improved process for the oxidation of hyrocarbons. More specifically, this invention teaches a technique for maintaining high overall yields in oxidation processes using boron compounds and the efficient utilization of such compounds in a recycle operation.

The oxidation of hydrocarbons in the presence of boron compounds is described in co-pending application 85,987, filed Jan. 31, 1961, now abandoned. This application clearly shows that in such oxidations, in particular of cycloalkanes, the overall yield to the corresponding alcohol is greatly improved. The reaction product of the oxidation contains boron esters of the corresponding alcohol. By the addition of water, the ester is hydrolyzed thereby forming boric acid and the free alcohol. When an excess of water is added, the boric acid which forms is dissolved therein. This aqueous phase is separated from the organic phase which contains the alcohol. In order to render the process economical, it is necessary to convert the boric acid solution into solid boric acid, and preferably, into dehydrated forms thereof, such as meta boric acid.

It has been found that the size of the boric acid particles is of particular importance in the oxidation reaction. In order to obtain high selectivity, it is essential that the meta boric acid be present in fine particles, namely, between 3 and 60 microns. If the particles are larger in size, poor selectivity is achieved because of the decreased surface area per unit volume of meta boric acid.

It was at first believed that the boric acid had to be of a fine particle size, in order to obtain fine particles of meta boric acid upon dehydration. This view was based upon experience with crystal dehydration by tray drying which indicated that this method of dehydration, while removing water from the crystal, did not substantially change the size of the resultant crystal. In experiments with the dehydration of boric acid this rule was found to hold.

The crystals formed upon hydrolysis of the reaction product from the oxidation by supplying only enough hydrolysis water to react with the borate esters are of a sufficiently small size as to permit their use in conventional dehydration techniques. However, where fine crystals are obtained from a crystallization, other difficulties become apparent. Namely, it is extremely difficult to separate the fine boric acid crystals from the water or organic solution. In addition, in the separation of fine crystals, there is a tendency to occlude large amounts of mother liquor, and, instead of obtaining pure crystals, the recovered boric acid is significantly contaminated. This contamination severely interferes with the selectivity of the subsequent oxidation, the oxidation being highly sensitive to impurities.

In accordance with this invention it has been found that the aforesaid problems can be overcome by forming large crystals and dehydrating them in the presence of an organic liquid medium.

By following the procedure hereinafter defined boric acid crystals having a particle size of from 100 to 1000 microns can be dehydrated to fine meta boric acid crystals having a particle size of from 3 to 60 microns.

The crystallization of the boric acid from the aqueous solution is a particularly important part of the instant invention. The rate of supersaturation must be carefully controlled so as to obtain crystals at least 90%, and preferably 95%, of which are greater than 100 microns. To achieve these crystal sizes a low degree of supersaturation should be maintained. This degree of supersaturation may be best expressed as the temperature of feed or feed-filtrate mixtures to a crystallizer above the magma temperature in the crystallizer. This supersaturation can be induced by any conventional method such as cooling the magma or feed mixtures through heat exchange surface to a coolant, heating the magma to effect vaporization of the solute and subsequent crystallization of solute, or preferably evacuating the magma and releasing the heat of the feed mixtures by vaporization (auto cooling) at temperatures below feed mixtures.

Broadly speaking the temperature differential should be 1 to 20° F. preferably between 4 and 18° F. For outstanding results the differential should be between 5 and 15° F.

The crystallization rate is also of particular importance. Broadly, it should be in the range of from 2 to 15 lbs. crystals/hr./ft.$^3$ of "active volume," from 3 to 5 lb./hr./ft.$^3$ are preferred. Active volume is the section of a crystallizer devoted solely to crystallization or deposition of solids, as opposed to mother liquor flashing, vapor disengaging, solids settling, or elutriation.

Another factor of lesser importance is the magma density. This should be broadly between 10% and 30% by weight of crystals in the active volume, 15 to 20% is preferable.

The crystals obtained are essentially spherical, e.g., ratio of length to width to thickness within 2:1:1 or 2:2:1 or 2:2:2, and can adequately be defined by one dimension, in this case the micron size, averred to above, has been used.

The separation of the crystals from the mother liquor can easily be performed in any known manner, for example, by centrifugation or vacuum filtration.

The crystals thus obtained do not require washing prior to their dehydration. However, of course, if desired, washing may be performed with water or any other appropriate liquid.

In order to obtain the appropriate small crystals upon dehydration it has been found that the dehydration must be carried out in the presence of an organic liquid. Conventional drying procedures, e.g., vacuum drying or air drying, do not alter crystal size. The liquid should not have a high solubility for the boric acid crystals and should preferably have a normal boiling point in excess of 50° C. Examples of appropriate dehydrating agents are cyclohexane, xylene, methylcyclohexane, etc. Of course, the material to be oxidized is the preferred dehydrating agent since it eliminates the need for a separate purification step.

The dehydration temperature should be broadly between 60° and 200° C., preferably 80 to 180° C. and most desirably from 130° to 170° C. These conditions are particularly suitable for the batch type dehydration. The batch dehydration is continued until the overhead stream contains a sufficiently low partial pressure of water. The particular partial pressure is determined by the conditions of subsequent oxidation.

In order to effect the dehydration the slurry may be brought to a boil at atmospheric pressure if the medium has a normal boiling point in the temperature ranges as cited above. On the other hand, lower boiling medium may be used at superatmospheric conditions to attain this temperature range or nitrogen or another inert gas can be bubbled through the solution below its boiling temperature, but in the temperature range cited.

In the case of continuous dehydration, it is preferable to maintain a maximum temperature of about 155° C. This maximum is also preferred if batch dehydration is initiated at high temperature.

In order to more clearly define the instant invention, attention is directed to the attached figure. For the sake of this illustration, the oxidation of cyclohexane, will be described. Meta boric acid in a slurry of cyclohexane passes via line 1 into oxidation reactor 2. An oxygen containing gas passes into reactor 2 via line 3 and is bubbled through the slurry. Cyclohexane, water, and non-condensibles are withdrawn via line 4 so as to appropriately control the water partial pressure. The oxidation products leave the oxidation reactor 2 and pass via line 5 to hydrator 6 wherein water is introduced via line 7. Sufficient water is added to hydrolyze the cyclohexyl borate esters and dissolve the resultant boric acid. The effluent from the hydrator 6 passes via line 8 to settler 9. An organic phase and an aqueous phase containing the bulk of the boric acid forms in the settler 9. The organic phase is withdrawn via line 10 and purified to recover cyclohexanol and cyclohexanone. This procedure requires the separation of of unreacted cyclohexane which is conventionally recycled. The aqueous phase passed to crystallizer 11 via line 12. Under controlled conditions of temperature, pressure, and supersaturation, boric acid crystals having a size in the range of from 100 to 1000 microns are formed. The slurry is sent via line 13 to solids separator 14. The crystals are separated by filtration or contrifugation from the filtrate, which leaves the system via line 15. The crystals of boric acid leave the separator 14 via line 16 to dehydrator 17. Cyclohexane is introduced into the dehydrator 17 via line 18 thereby forming a slurry with the boric acid crystals. The dehydrator 17 is brought to a temperature of 150° C. and a pressure of 125 p.s.i.g. while nitrogen from line 19 is sparged therethrough. Meta boric acid particles form in the dehydrator in the size range of from 5 to 60 microns and are uniquely suitable for the subsequent oxidation. Water and nitrogen are removed from the dehydrator through line 20. Any cyclohexane removed therethrough is recovered and recycled.

The above figure is intended only to show the major steps in the process. It should be understood that many modifications not illustrated may be employed. For example, the boric acid crystals in line 16 may be washed prior to being passed through the dehydrator. The water removed from the crystallizer and the crystal wash may be advantageously used as the water of hydration in hydrator 6. Such modifications, however, are merely alternate embodiments of the instant invention.

Though the above illustration is concerned with the oxidation of cyclohexane other hydrocarbons may be similarly oxidized. Particularly preferred are cycloalkanes such as cyclohexane, methylcyclohexane, cyclopropane and cyclooctane. The boron compounds include any compound which is capable of reacting with the cycloalkanol which is formed in the reaction. Most preferred is meta boric acid and boron oxide.

The amount of boron compound used to improve the selectivity varies widely. Generally, of course, sufficient amounts should be added to react with all of the alcohol formed in the reaction. Lesser amounts will result in lower selectivities.

Air may be used as the oxidizing agent, however, oxygen containing streams having more or less amounts of oxygen may be employed. Most preferably, however, the oxidation should be performed in the presence of a gas having between 5 and 15% oxygen.

Suitable oxidation reaction temperatures are broadly 100° to 200° C., desirably 140° to 180 C. It is necessary that the reaction be carried out with efficient water removal, most commonly by vaporizing the hydrocarbon and water. The condensed hydrocarbon and water are separated. Of course, other water removal techniques can be used.

In order to more specifically set forth the particular invention, the following examples are given:

*Example 1*

A dehydration reactor is charged with 110 pounds cyclohexane and 6.2 pounds of ortho boric acid, pressured to 125 p.s.i.g., and heated slowly to 165° C., while passing nitrogen at from 2 to 6 standard cubic ft./minute through the liquid to strip off water. The batch is held at 165° C. to complete the dehydration. The dehydration is considered complete when only a relatively small amount of water appears in the nitrogen stream. The boric acid referred to above is obtained from a previous crystallization step and has a particle size which is about 500 microns. Upon completion of the dehydration the 110 pounds of cyclohexane contains about 4.4 pounds of meta boric acid, having a particle size of about 20 microns. The slurry is passed to the oxidation reactor. The reactor is maintained at a pressure of about 125 p.s.i.g. and a temperature of about 165° C. The charge is oxidized by using a 10% oxygen and 90% nitrogen until 0.116 pound moles of oxygen react. The reactor is emptied and the effluent hydrolyzed at 80° C. using 9 pounds of recycle filtrate (containing about 8% boric acid) which is sufficient to hydrolyze the ester and just completely dissolve the resultant boric acid. The organic phase is separated from the aqueous phase and the former is purified in the conventional manner to obtain cyclohexanol and cyclohexanone.

Boric acid is precipitated from the aqueous phase in a vacuum crystallizer. The crystallizer is maintained at a temperature of 42° C. and 1.25 p.s.i.a. Clear filtrate is collected from the settling section of the crystallizer and heated to 45° C. The filtrate is mixed with the aqueous phase in a ratio of 10 parts filtrate to 1 part feed. This mixture is introduced into the crystallizer where upon it mixes with the circulating magma. To establish thermal equilibrium a portion of the feed mixture is vaporized and boric acid deposits on existing crystals in the magma as well as producing some nuclei. Heat is supplied and removed, and feed and product magma flows controlled, so as to maintain a crystallization rate of 4 pounds per hour per ft.³ of active volume. A slurry containing 15% of boric acid is withdrawn from the crystallizer and dewatered with a centrifugal decanter to a solids moisture content of about 4%. These solids have a particle size of about 100 to 1000 microns and are passed to the dehydration step. The filtrate is collected and may be used for the hydrolysis. Some make-up water is added.

The oxidation, when repeatedly performed in accordance with the procedure, maintains continuously high selectivity to the cyclohexanol and cyclohexanone, i.e., about 86% after 4 passes.

*Example 2*

Using the same oxidation and hydrolysis conditions as set forth in Example 1, the aqueous phase is rapidly cooled thereby forming fine particles of boric acid, namely, in the 20 micron range. It is found that these crystals, formed during the crystallization, are difficult to separate from the mother liquor taking significantly longer to settle out from the aqueous phase. After following the same wash procedure as set forth above these crystals were dehydrated in cyclohexane. The meta boric acid slurry is recycled and oxidation carried out under the same conditions. A noted drop in selectivity is shown particularly after several recycles, namely, after four recycles the selectivity was less than 80%.

The decrease in selectivity may be attributed to the incomplete washing of the fine boric acid crystals, a washing made diffcult by the occlusion of the mother liquor on the fine high surface area crystals.

*Example 3*

The oxidation technique of Example 1 is again repeated. However, in the hydrolysis step only sufficient water to hydrolyze the borate esters and convert the meta boric acid to boric acid is added. The boric acid formed crystallizes out from the organic phase, and only with great difficulty is separated. The difficulty in separation is brought about by the fine crystals seen during both the decanting and centrifugation operation. The crystals are washed as set forth in Example 1. After dehydration in the manner described the meta boric acid slurry is recycled to the oxidation reactor. The first recycle run shows a 2% loss in selectivity. After four runs the selectivity is reduced to 79%.

*Example 4*

The oxidation of Example 1 is repeated, excepting that meta boric acid obtained by tray drying ortho-boric acid in an oven at 120° C. is used, rather than meta boric acid obtained by slurry dehydration techniques. This meta boric acid has a particle size of 60 to 100 microns. The selectivity to cyclohexanol and cyclohexanone is found to be decreased to about 83%.

It will be understood that modifications and variations may be affected without departing from the spirit of the invention.

I claim:

1. In a process of the oxidation of $C_3$ to $C_8$ cycloalkanes in the presence of a boron compound wherein the reaction mass contains boron esters of alcohols corresponding to said cycloalkanes, and wherein said reaction mass is hydrolyzed to form an organic phase containing alcohols corresponding to said cycloalkanes and an aqueous phase containing boric acid, the improvement of: crystallizing said boric acid from said aqueous phase by maintaining a super-saturation of between 1 and 20° F., a crystallization rate of from 2 to 15 pounds of crystals per hour per cubic foot of active volume and a magma density between 10 and 30% by weight of crystals, thereby obtaining crystals having a particle size in the range of from 100 to 1000 microns, separating said crystals; passing said crystals to a dehydrator; forming a slurry of said crystals in a hydrocarbon; heating said slurry to a temperature of 60 to 200° C. and dehydrating said boric acid crystals and withdrawing a slurry containing metaboric acid crystals having a crystal size from 3 to 60 microns.

2. The process of claim 1 wherein said slurry containing boric acid crystals is dehydrated by heating to a temperature between 100 and 200° C.

3. The process of claim 2 wherein the hydrocarbon in which the boric acid is dehydrated is a cycloalkane.

4. The process of claim 2 wherein said oxidized cycloalkane is the same cyclolkane in which the boric acid is dehydrated.

5. The process of claim 4 wherein said material is cyclohexane.

6. In a process for the oxidation of cyclohexane in the presence of metaboric acid, wherein the reaction mass contains boron esters of cyclohexanol, and herein said reaction mass is hydrolyzed to form an organic phase containing cyclohexanol and an aqueous phase containing boric acid, the improvement of: crystallizing said boric acid from said aqueous phase by maintaining a super-saturaiton of between 4 and 18° F., a magma density between 10 and 30% by weight of crystals, and a crystallization rate of from 2 to 15 pounds of crystals per hour per cubic ft. of active volume, thereby forming crystals of a size between 100 and 1000 microns; separating said boric acid crystals; forming a slurry of said crystals in cyclohexane; heating said slurry to a temperature between 130 and 180° C., thereby dehydrating said boric acid to metaboric acid having a crystal size between 3 and 60 microns; and passing said dehydrated slurry to an oxidation zone.

7. The process of claim 5 wherein the said boric acid crystals are dehydrated by bubbling an inert gas through said slurry.

References Cited

UNITED STATES PATENTS 1,947,989  2/1934  Hellthaler et al. _____ 260—632
3,109,864  11/1963  Fox et al. _____ 260—617

FOREIGN PATENTS 541,333  3/1956  Belgium.

OTHER REFERENCES

Bashkirov et al.: "Khim. Nauk, i Prom." vol. 4 (1959), pp. 607–12.

Parkes: "Mellor's Modern Inorganic Chemistry" (1951), pp. 691–2.

BERNARD HELFIN, *Acting Primary Examiner.*

LEON ZITVER, *Examiner.*

M. B. ROBERTO, T. G. DILLAHUNTY,
*Assistant Examiners.*